United States Patent
Harayama et al.

(10) Patent No.: US 7,295,260 B2
(45) Date of Patent: Nov. 13, 2007

(54) LIQUID-CRYSTAL DISPLAY DEVICE

(75) Inventors: Takeshi Harayama, Mobara (JP); Shiro Ueda, Suzhou (CN); Fumitoshi Matsuda, Yasu (JP); Nobuyuki Mitsuhashi, Chiba (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 420 days.

(21) Appl. No.: 10/964,682

(22) Filed: Oct. 15, 2004

(65) Prior Publication Data
US 2005/0110920 A1 May 26, 2005

(30) Foreign Application Priority Data
Oct. 15, 2003 (JP) ............................. 2003-354494

(51) Int. Cl.
*G02F 1/13357* (2006.01)
(52) U.S. Cl. ..................... 349/61; 349/58; 349/64; 349/65
(58) Field of Classification Search ............. 349/58, 349/61, 64, 65; 362/600, 615, 632, 633, 362/634
See application file for complete search history.

(56) References Cited
U.S. PATENT DOCUMENTS
6,411,353 B1 * 6/2002 Yarita et al. ................. 349/59
6,456,344 B1 * 9/2002 Nemoto et al. ............... 349/64

FOREIGN PATENT DOCUMENTS
JP 11-337942 12/1999

\* cited by examiner

*Primary Examiner*—Toan Ton
*Assistant Examiner*—Tai Duong
(74) *Attorney, Agent, or Firm*—Antonelli, Terry, Stout & Kraus, LLP.

(57) ABSTRACT

Optical sheets can be fixed easily and positively in a liquid-crystal display device having a liquid-crystal display panel in which a liquid-crystal layer sandwiched between a pair of substrates and a lighting unit provided on a surface opposite to a display surface of the liquid-crystal display panel. For this purpose, a projection is provided on a sidewall of an accommodator, and the projection is inserted into a hole provided in optical sheets arranged within the accommodator, thereby fixing the optical sheets in the accommodator. The length along a certain straight line of a top plan form of a tip of the projection is longer than the length along the certain straight line of the hole formed in the optical sheets, thus preventing the optical sheets from falling out of the accommodator.

10 Claims, 7 Drawing Sheets

LIQUID-CRYSTAL DISPLAY DEVICE

BACKGROUND OF THE INVENTION

The present invention relates in general to liquid-crystal display devices, and, more particularly, to a method of aligning optical sheets in a thicknesswise direction of the liquid-crystal display device.

TFT-type liquid-crystal display modules, using thin film transistors (TFTs) as active elements, are broadly used as display devices, such as in personal computers, monitors and television receivers. These liquid-crystal display modules are each constituted by a liquid-crystal display panel arranged with a drive circuit in the periphery thereof and a backlight for illuminating the liquid-crystal display panel.

The backlights are roughly divided into two basic types, including the under-lighting type backlight, in which a that the cold-cathode fluorescent lamp is arranged underneath a light conductor, and the side-lighting type backlight, in which the cold-cathode fluorescent lamp is arranged at one side face of the light conductor. In both types of backlights, optical sheets (diffusion sheets, prism sheets) are arranged over the top surface (the liquid-crystal display panel side) of the light conductor.

Conventionally, for the purpose of fixing such optical sheets is positioned, a hole is formed in the optical sheets so that a projection formed in a sidewall of an optical-sheet accommodating mold can be inserted in the hole, followed by adhering a tape over the projection from above in order to fix the projection in the hole.

However, with this method, the adhesive tape is readily peeled off the projection because the area of the projection in contact with the tape is small in diameter. In the worst case, it is possible for the optical sheets to move in a thicknesswise direction of the liquid-crystal display device and fall out of the mold. Besides, there is the possibility of inferior production efficiency due to the need to paste an adhesive tape on the assembly.

In order to solve the foregoing problem, Document 1 (Japanese Patent Laid-Open Hei 11-337942) discloses a technique in which an engagement claw is formed at the head of an engagement piece so that the optical sheets can be prevented from falling out of the engagement piece due to the providing of the engagement claw.

SUMMARY OF THE INVENTION

However, in the technique disclosed in Document 1, the diameter of the engagement claw is nearly the same as the diameter of the hole formed in the optical sheet. In the worst case, it is possible for the optical sheet to disengage from the engagement claw.

The present invention has been made in order to solve the problem discussed above. It is an object of the present invention to provide a technique that is capable of fixing optical sheets easily and positively.

The foregoing and other objects and novel features of the invention will be made apparent by the following description and the accompanying drawings.

An outline of representative aspects and features of the invention will be presented.

In order to achieve the foregoing object, the present invention provides a liquid-crystal display device comprising a liquid-crystal display panel having a liquid-crystal layer sandwiched between a pair of substrates, and a backlight unit provided on a surface opposite to a display surface of the liquid-crystal display panel. A projection is provided on a sidewall of an accommodator. A hole provided in the optical sheet arranged within the accommodator is disposed to allow the projection to be inserted therein to thereby fix the optical sheet in the accommodator. The projection has a tip having a top plan form having a length along a certain straight line which is longer than the length along the certain straight line of the hole formed in the optical sheet, thereby preventing the optical sheet from becoming disengaged from the accommodator.

Meanwhile, the present invention provides a liquid-crystal display device comprising a liquid-crystal display panel having a liquid-crystal layer sandwiched between a pair of substrates, and a backlight unit provided on a surface opposite to a display surface of the liquid-crystal display panel. A projection is provided on a sidewall of an accommodator. A hole provided in the optical sheet arranged within the accommodator is disposed to allow the projection to be inserted therein to thereby fix the optical sheet.

Meanwhile, the form of the hole formed in the optical sheet has the same top plan form so that of the tip of the projection. Furthermore, the hole is formed so that a certain rotation angle exists between the form of the hole and the top plan form of the tip of the projection in a state in which the optical sheet is accommodated in the accommodator. In the state in which the optical sheet is accommodated in the accommodator, the optical sheet at a peripheral part of the hole is engaged with the tip of the projection, thereby preventing the optical sheet from becoming disengaged from the accommodator.

DETAILED DESCRIPTION OF THE INVENTION

Figure 1:
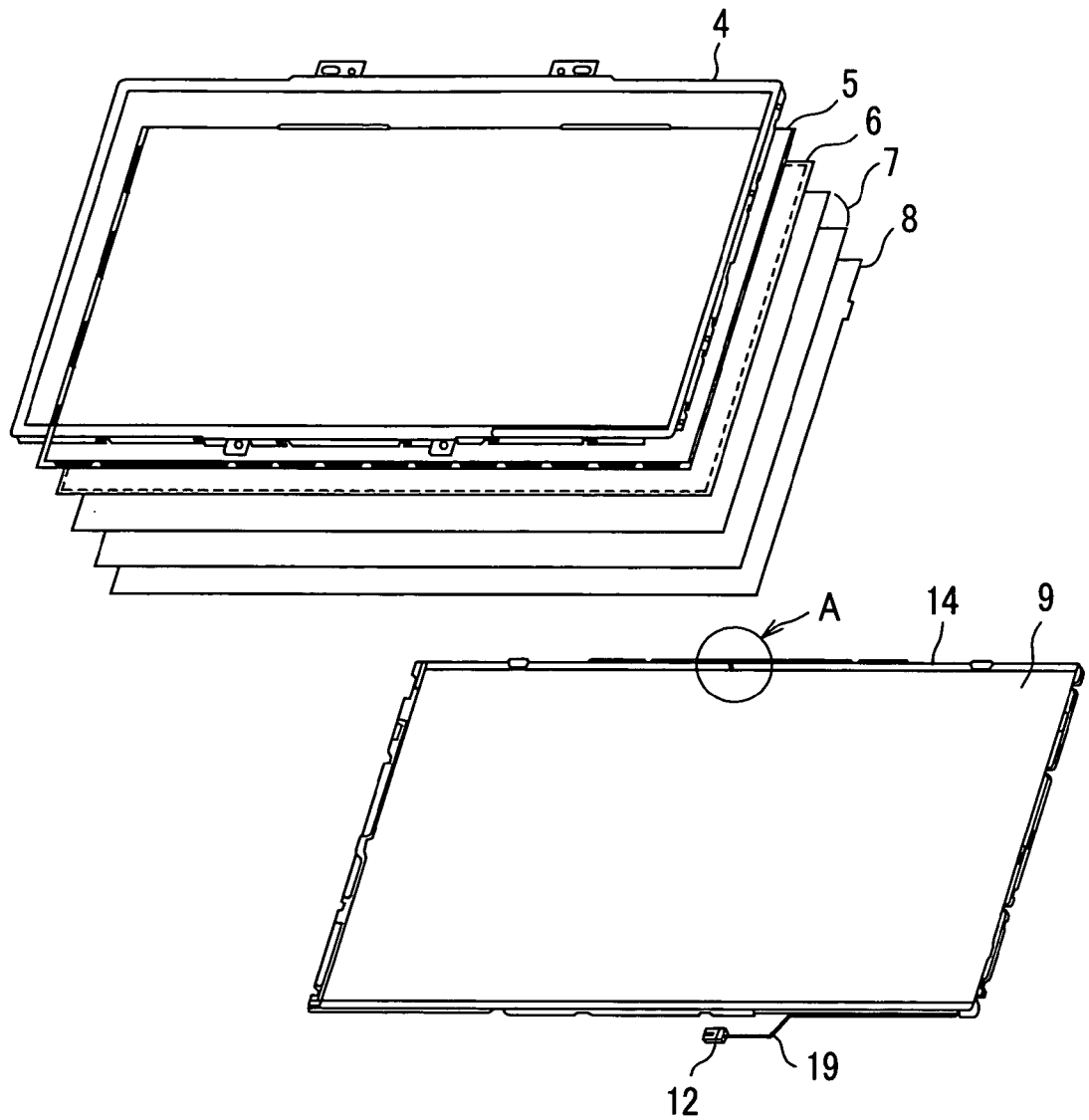
FIG. 1 is an exploded perspective view showing the structure of a liquid-crystal display module representing an embodiment of the present invention.

Various embodiments of the present invention will now be explained with reference to the drawings.

Note that those elements having the same function are identified in all of the views by the same reference numerals, and duplicated explanations thereof will be omitted.

EMBODIMENT 1

FIG. 1 is an exploded perspective view showing the structure of a TFT-type liquid-crystal display module according to an embodiment of the present invention.

The liquid-crystal display module of this embodiment is an active-matrix liquid-crystal display module having its drive element (semiconductor chip) mounted on one of a pair of substrates constituting a liquid-crystal display panel by means of a flip-chip attachment (FCA) type of mounting scheme. The main constituent elements are as follows.

The liquid-crystal display module (LCM) of this embodiment is constructed with a frame made of a metal plate (upper case) 4, a liquid-crystal display panel 5, and a backlight.

The liquid-crystal display panel 5, shown as a panel provided with an assembled drive circuit board, has a pair of substrates superposed and jointed together so as to sandwich a liquid-crystal layer therebetween (e.g. formed of an optically transmissive, electrically insulative material, such as glass), a group of liquid-crystal-driving semiconductor integrated circuit elements (drive ICs) arranged at a peripheral edge of one of the pair of substrates, a flexible circuit board (not shown) for supplying signals or power to these drive ICs externally of the liquid-crystal display panel, and an interface circuit board (not shown).

The paired substrates are superposed so as to be spaced with a predetermined gap. Both substrates are bonded together by a seal member provided in a frame form close to a peripheral edge thereof. Liquid crystal is filled into the inside space defined by the seal member between the substrates through a liquid-crystal filling port provided in part of the seal member, and the filling port is then sealed. Furthermore, polarizer plates are bonded to the outer sides of both substrates.

A metal-plate frame (referred also to as a shield case, upper case or metal frame) 4 is arranged on the assembled liquid-crystal display panel 5, such that its display window exposes the main surface of the liquid-crystal display panel 5 corresponding to the effective display region. Accordingly, the frame 4 has a frame-formed planar structure. Furthermore, a housing (not shown) is provided with a display window of the type employed in a personal computer, for example. In a personal computer, for example, the user is allowed to view the liquid-crystal panel 5 shown in FIG. 1 from above and recognize an image displayed in the effective display region.

In FIG. 1, optical sheets (an upper diffusion sheet 6, two prism sheets 7 and a lower diffusion sheet 8) are arranged underneath the assembled liquid-crystal display panel 5 and are supported through use of a rubber cushion (not shown), for example. Incidentally, in accordance with the invention, the optical sheets include at least one optical sheet in the form of the upper diffusion sheet 6, the two prism sheets 7, the lower diffusion sheet 8 and the like.

As shown in FIG. 1, the optical sheets are laid one over another by arranging the upper diffusion sheet 6 and the lower diffusion sheet 8 above/beneath the two prism sheets 7. The optical sheets are fixed at their one ends tab which extends into a recess formed, by a, in a sidewall at the peripheral edge of a mold 14 (referred to also as a lower case).

A light conductor 9 is accommodated in the mold 14 such that its upper surface is opposed to an underside of the lower diffusion sheet 8. Furthermore, a reflection sheet (not shown) is arranged underneath the light conductor 9. The mold 14, in many cases, is formed by integral molding of a white synthetic resin or the like, on which a cold-cathode fluorescent lamp (not shown) and a lamp cable 19 are fixed by means of a rubber bush (not shown). The lamp cable 19 has respective ends provided with connectors 12 for connection to an inverter circuit (not shown), to supply power from the inverter circuit provided on the underside of the mold 14 to a cold-cathode fluorescent lamp.

In this manner, in the backlight of the liquid-crystal display module of this embodiment, the cold-cathode fluorescent lamp, the wedge-formed (trapezoid as seen in side form) conductor 9, the diffusion sheets (6, 8), the prism sheets 7 and the reflection sheet have sidewalls and are fitted in the mold 14 which is formed in the shape of a frame. The assembled liquid-crystal panel 5 is fixed by being sandwiched between the frame 4 and the backlight, thus forming complete liquid-crystal display module.

Figure 2:
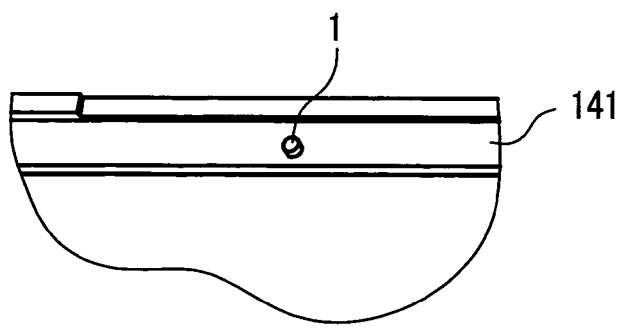
FIG. 2 is an enlarged plan view of part A shown in FIG. 1.

FIG. 2 is an enlarged view of part A in FIG. 1. As shown in FIG. 2, in this embodiment, a projection (or pin) 1 is formed on the sidewall 141 of the mold 14.

Figure 3:
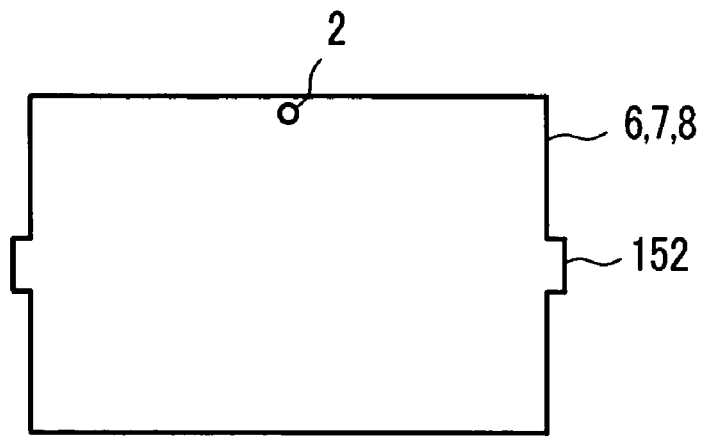
FIG. 3 is a diagram showing optical sheets (upper diffusion sheet, two prism sheets and lower diffusion sheet) in the display module shown in FIG. 1.

FIG. 3 shows an example of the configuration of the optical sheet (upper diffusion sheet 6, two prism sheets 7 and lower diffusion sheet 8) shown in FIG. 1. As shown in FIG. 3, the optical sheet is formed with a hole 2 into which the projection 1 is to be inserted. The hole 2 formed in the optical sheets is positioned over the projection 1 formed in the sidewall 141 of the mold 14 to allow the projection 1 to come into engagement therewith, thereby fixing the optical sheets.

Meanwhile, in FIG. 3, the reference 152 refers to a tab to be inserted in a recess 142 formed in the sidewall 141 of the mold 14.

Figure 4A:
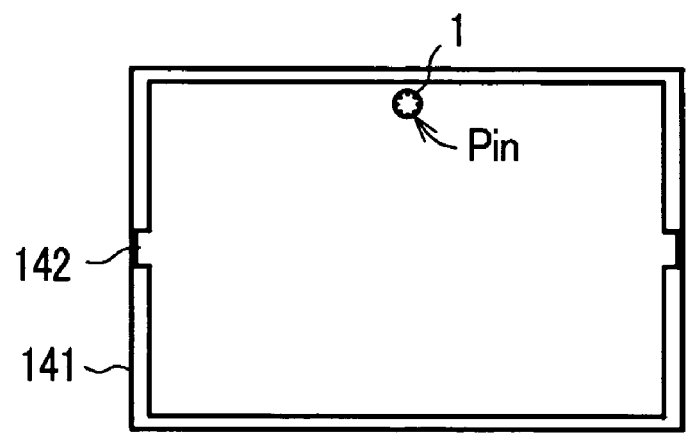
FIG. 4A is a plan view and FIGS. 4B and 4C are diagrams illustrating a method of fixing the optical sheets of embodiment 1 of the invention.
Figure 4B:
Figure 4B:
Figure 4C:

FIGS. 4A to 4C illustrate a method of fixing the optical sheets of this embodiment. For this purpose, the hole 2 formed through the optical sheets is positioned over the projection 1 formed on the sidewall 141 of the mold 14 to allow the projection 1 to engage therewith, thereby arranging the upper diffusion sheet 6, the two prism sheets 7 and the lower diffusion sheet 8 onto the light conductor plate, as shown in FIG. 4B.

Then, the projection 1 is crushed at its top end (or its head) by a technique such as heating, for example, as shown in FIG. 4C. Thus, the top end of the projection 1 is enlarged in diameter so as to be greater than the diameter of the hole 2 formed in the optical sheets.

FIG. 4A shows a state in which the upper diffusion sheet 6, the two prism sheets 7 and the lower diffusion sheet 8 are arranged on the light conductor plate within the mold.

As shown in FIG. 4A, in this embodiment, the tabs 152 formed on the optical sheet are inserted in the recesses 142 formed in the sidewall 141 of the mold 14, thus aligning the optical sheet. Furthermore, the crushed tip of the projection 1 formed on the sidewall 141 of the mold 14 prevents the optical sheets from moving in a direction thicknesswise of the liquid-crystal display device and falling out of the mold 14.

Figure 16A:
FIGS. 16A and 16B are diagrams illustrating a known method of fixing the optical sheets.
Figure 16B:

FIGS. 16A and 16B illustrate a conventional method of fixing the optical sheets. In the conventional optical sheet fixing method, the hole 2 formed through the optical sheets is positioned over the projection 1 formed on the sidewall 141 of the mold 14 so that the projection 1 engages with the hole 2, as shown in FIG. 16A, thereby arranging the upper diffusion sheet 6, the two prism sheet 7 and the lower diffusion sheet 8 on the light conductor plate.

Then, as shown in FIG. 16B, an adhesive tape 30 is pasted over the hole 2 onto the tip of the projection 1. This is intended to prevent the optical sheets from moving in a direction of the thickness of the liquid-crystal display device and falling out of the mold 14. However, with use of this method, the adhesive tape 30 is readily peeled off the projection because the projection 1 is small in diameter and, therefore, has only a small surface in contact with the tape. It can be considered that, in the worst case, the optical sheet can move in a direction thicknesswise of the liquid-crystal display device and disengage from the mold 14.

On the contrary, in the present embodiment, the tip of the projection 1 formed on the sidewall 141 of the mold 14, which has been crushed to a size larger than the hole, can positively prevent the optical sheets from moving in a direction thicknesswise of the liquid-crystal display device and fall out of the mold 14. This makes it possible to fix the optical sheets easily and positively.

EMBODIMENT 2

Figure 5A:
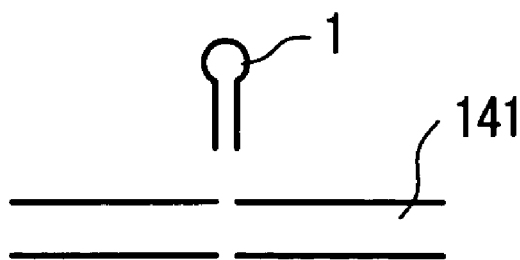
FIG. 5A is a plan view and FIGS. 5B and 5C are diagrams illustrating a method of fixing the optical sheets of embodiment 2 of the invention.
Figure 5B:
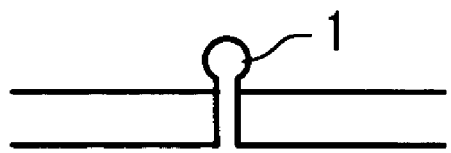
Figure 5C:
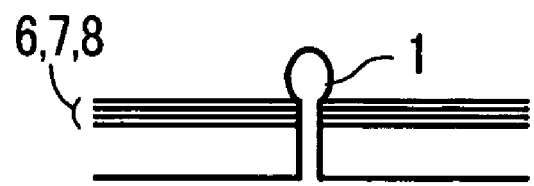

FIGS. 5A to 5C illustrate a method of fixing the optical sheets according to an embodiment 2 of the invention.

Although in the foregoing embodiment the projection 1 is formed integrally with the mold 14, this embodiment provides a projection 1 which is formed separately therefrom, as shown in FIG. 5A. In this case, the projection 1, which is made separately, is inserted in the sidewall 141 of the mold 14, as shown in FIG. 5B.

Then, as shown in FIG. 5C, a hole 2 formed through the optical sheets is positioned over the projection 1 formed on the sidewall 141 of the mold 14 so that the projection 1 engaged with the hole 2, thereby arranging the upper diffusion sheet 6, the two prism sheets 7 and the lower diffusion sheet 8 on the light conductor plate.

In this case, because the diameter of the hole 2 formed through the optical sheets is smaller than the diameter at the tip of the projection 1, the hole 2 formed through the optical sheets is placed onto the light conductor plate while screwing it onto the projection 1.

After this, in accordance with the present embodiment, the tabs 152 formed on the optical sheets are inserted in the recesses 142 formed in the sidewall 141 of the mold 14, thus aligning the optical sheets. Moreover, the enlarged tip of the projection 1 prevents the optical sheets from moving in a direction thicknesswise of the liquid-crystal display device and falling out of the mold 14. Accordingly, the present embodiment also makes it possible to fix the optical sheets easily and positively.

Figure 6:
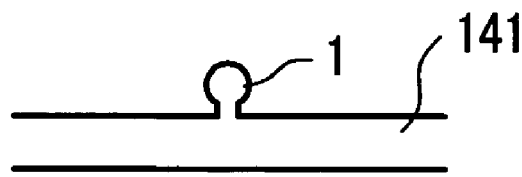
FIG. 6 is a diagram showing a modification of a projection employed in embodiment 2 of the invention.

Incidentally, in this embodiment, the projection 1 also may be formed integral with the mold 14, as shown in FIG. 6.

Figure 7A:
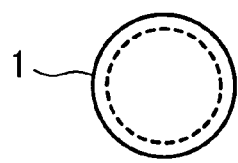
FIG. 7A is a top plan view and FIG. 7B is a side view showing a modification of a projection employed in embodiment 2 of the invention.
Figure 7B:
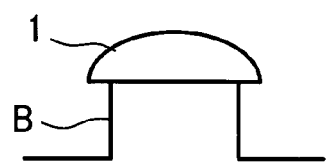

As an alternative, the tip of the projection 1 may have a semispherical form, as shown in FIGS. 7A and 7B, without being limited to the spherical form shown in FIGS. 5A to 5C. Note that FIG. 7A is a diagrammatic top plan view (hereinafter, referred to as the top plan form) of the projection 1 as viewed from above, while FIG. 7B is a diagrammatic sectional view showing the sectional shape of the projection 1.

Figure 8:
FIG. 8 is a top plan view showing a modification of a projection employed in embodiment 2 of the invention.

On the other hand, the top plan form at the tip of the projection 1 also may be in a semispherical form, as shown in FIG. 8, without being limited to the circular form shown in FIGS. 5A to 5C. Note that FIG. 8 is a top plan view showing the top side form of the projection 1.

Figure 9:
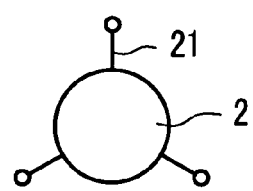
FIG. 9 is a top plan view showing a modification of the optical sheet employed in embodiment 2 of the invention.
Figure 10:
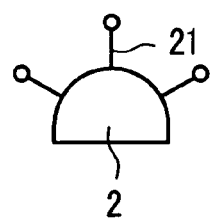
FIG. 10 is a top plan view showing a modification of the optical sheet employed in embodiment 2 of the invention.

In addition, the sectional form of the projection 1 in the other portion than the tip (portion B shown in FIG. 7B) is not limited to the circular form shown in FIG. 7A, but may be have an elliptical form or a polygonal form, such as rectangular. Meanwhile, by forming slits 21, as shown in FIGS. 9 and 10 at around the periphery of the hole 2 formed through the optical sheets, the hole 2 formed through the optical sheets can easily pass over the enlarged projection 1 formed on the sidewall 141 of the mold 14.

EMBODIMENT 3

In the foregoing embodiment 2, there is a fear that the optical sheet may be deformed due to the necessity to place the hole 2, which is formed through the optical sheets, onto the light conductor plate by screwing it onto the projection 1. The present embodiment is designed to avoid such a disadvantage.

Figure 11A:
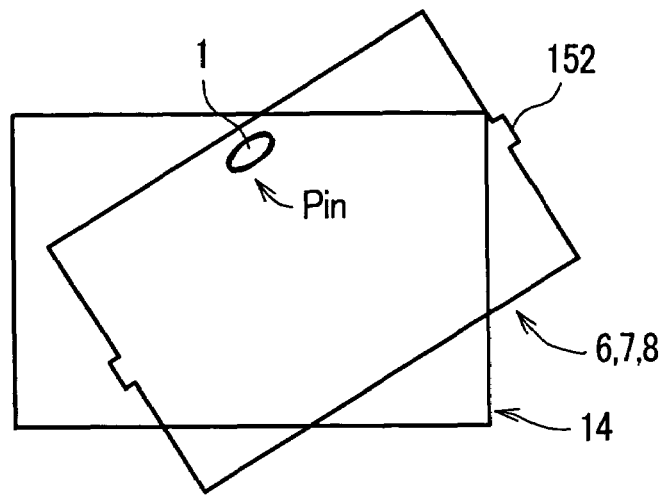
FIGS. 11A to 11C are diagrams illustrating a method of fixing the optical sheets in an embodiment 3 of the invention.
Figure 11B:
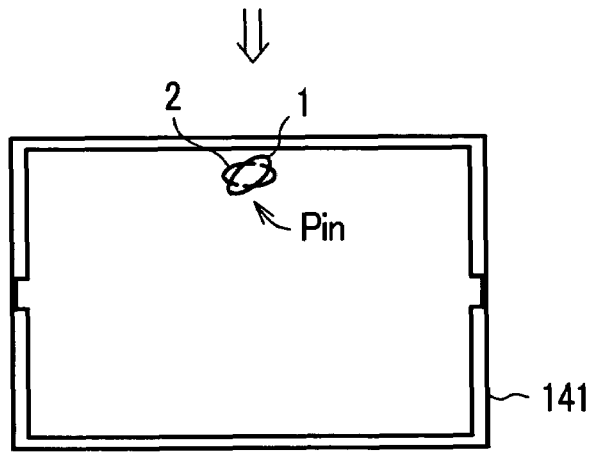
Figure 11C:
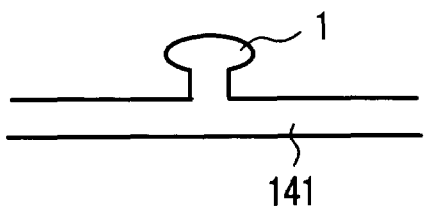

FIGS. 11A to 11C are diagrams which illustrate a method of fixing the optical sheets in accordance with embodiment 3 of the invention.

In this embodiment, the hole 2 that is formed through the optical sheets is made to have the same non-circular shape as the shape of the tip of the projection 1 formed in the sidewall 141 of the mold 14 (elliptical in FIG. 11).

The hole 2 is formed in the optical sheets such that a certain rotational angle is established between the long axis of the hole 2 and the long axis of the tip of the projection 1 in a state in which the optical sheets are arranged on the light conductor plate within the mold.

For this reason, in this embodiment, the projection 1 is inserted into the hole 2 of the optical sheets by rotating the optical sheets about the projection 1 through a certain rotation angle, as shown in FIG. 11A, until the shape of the hole 2 matches the shape of the projection 1. In this case, because the hole 2 formed in the optical sheets is aligned with the tip of the projection 1, the projection 1 can be easily inserted into the hole 2 formed in the optical sheets without applying a force.

Thereafter, the optical sheets are rotated again on the light conductor plate such that the tab 152 of the optical sheets is received in the recess 142 of the sidewall 141 of the mold 14, as shown in FIG. 11B. In this state, the hole 2 of the optical sheets at its peripheral part is engaged by the tip of the projection 1.

Due to this, in this embodiment, the tab 152 formed in the optical sheets is inserted in the recess 142 formed in the sidewall 141 of the mold 14, thereby aligning the optical sheets. Furthermore, the tip of the projection 1 prevents the optical sheets from moving in a direction thicknesswise of the liquid-crystal display device and falling out of the mold 14. Therefore, this embodiment also makes it possible to fix the optical sheets easily and positively.

Figure 12:
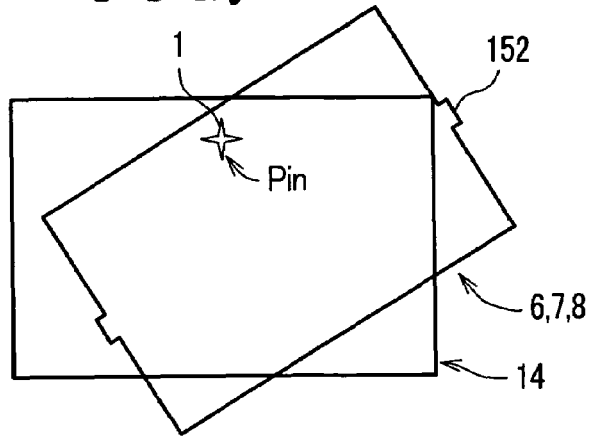
FIG. 12 is a diagram showing a modification of a projection employed in embodiment 3 of the invention.
Figure 12:
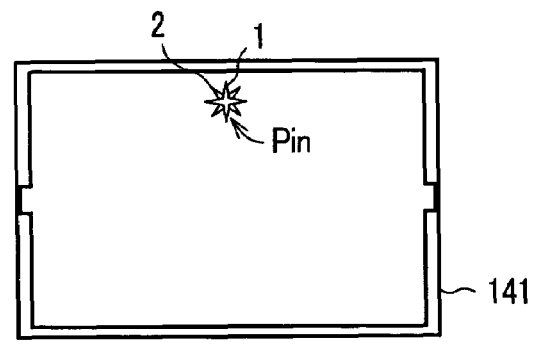
Figure 13:
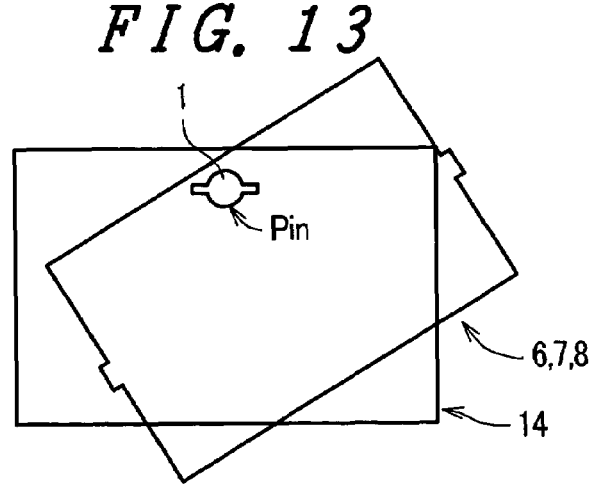
FIG. 13 is a diagram showing a modification of a projection employed in embodiment 3 of the invention.
Figure 13:
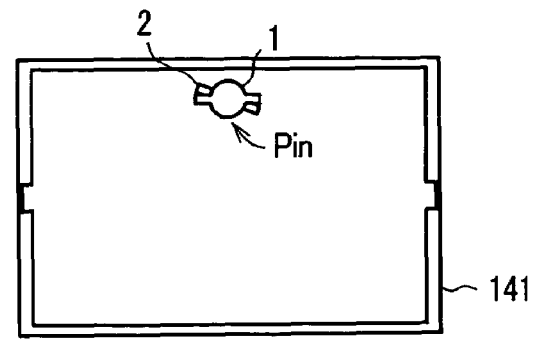
Figure 14A:
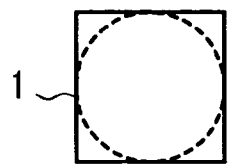
FIG. 14A is a top plan view and FIG. 14B is a side view showing a modification of a projection employed in embodiment 3 of the invention.
Figure 14B:
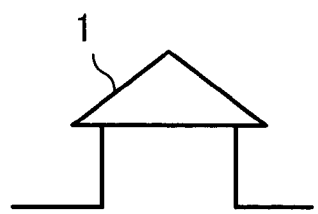

Incidentally, in this embodiment, the shape at the tip of the projection 1 is not limited to elliptical form, as shown in FIGS. 11A to 11C, but may be in the form of a cross, as shown in FIG. 12, a combined circle and rectangular part, as shown in FIG. 13, or a rectangular form, as shown in FIGS. 14A and 14B. Note that FIG. 14A is a top plan view showing the top of the projection 1, while FIG. 14B is a sectional view showing the side of the projection 1.

Figure 15:
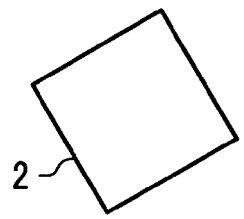
FIG. 15 is a diagram showing a modification of the optical sheet employed in embodiment 3 of the invention.

FIG. 15 shows the shape and orientation there is shown a form of the hole 2 formed in the optical sheets that are arranged on the light conductor plate in the case where the top plan form at the tip of the projection 1 is a square as shown in FIG. 14A.

Incidentally, although the foregoing embodiment has been explained mainly in conjunction with examples where the invention is applied to TFT-type liquid-crystal display module, the invention is not limited to that. In this regard, it should be understood that the invention is applicable also to an STN-type liquid-crystal display module.

Although the invention made by the present inventor has been explained on the basis of the foregoing embodiments, the invention is not limited to the foregoing embodiments, but can be modified in various ways within a scope not departing from the gist thereof.

According to the liquid-crystal display device of the present invention, optical sheets can be fixed easily and positively in the liquid-crystal display device.

The invention claimed is:

1. A liquid-crystal display device comprising:
   a liquid-crystal display panel having a liquid-crystal layer sandwiched between a pair of substrates; and
   a backlight unit provided on a surface opposite to a display surface of the liquid-crystal display panel;
   wherein the backlight unit has an accommodator capable of having at least one optical sheet arranged therein and having a sidewall having a projection at a periphery thereof;
   the optical sheet having a hole into which the projection is inserted, the projection having a tip having a top plan form having a length along a certain straight line that is longer than the length along the certain straight line of the hole formed in the optical sheet.

2. A liquid-crystal display device according to claim 1, wherein the projection and the accommodator are formed as an integral member.

3. A liquid-crystal display device according to claim 1, wherein the optical sheet has at least one slit at the periphery around the hole.

4. A liquid-crystal display device comprising:
   a liquid-crystal display panel having a liquid-crystal layer sandwiched between a pair of substrates; and
   a backlight unit provided on a surface opposite to a display surface of the liquid-crystal display panel;
   wherein the backlight unit has an accommodator capable of having at least one optical sheet arranged therein and having a sidewall having a projection at a periphery thereof;
   the optical sheet having a hole into which the projection is inserted, wherein, as viewed from above, the projection has a tip having a periphery which extends beyond the edge of the hole formed in the optical sheet.

5. A liquid-crystal display device according to claim 4, wherein the projection and the accommodator are formed as an integral member.

6. A liquid-crystal display device according to claim 4, wherein the optical sheet has at least one slit at the periphery around the hole.

7. A liquid-crystal display device comprising:
   a liquid-crystal display panel having a liquid-crystal layer sandwiched between a pair of substrates; and
   a backlight unit provided on a surface opposite to a display surface of the liquid-crystal display panel;
   wherein the backlight unit has an accommodator capable of having at least one optical sheet arranged therein and having a sidewall having a projection at a periphery thereof;
   the optical sheet having a hole into which the projection is inserted, the projection having a tip having a diameter greater than the diameter of the hole formed in the optical sheet.

8. A liquid-crystal display device according to claim 7, wherein the projection and the accommodator are formed as an integral member.

9. A liquid-crystal display device according to claim 7, wherein the projection has a tip having a diameter that is greater than the diameter of the hole formed in the optical sheet, due to a deforming of the tip of the projection.

10. A liquid-crystal display device according to claim 7, wherein the optical sheet has at least one slit at the periphery around the hole.

* * * * *